US007194287B2

(12) United States Patent
Usuki et al.

(10) Patent No.: US 7,194,287 B2
(45) Date of Patent: Mar. 20, 2007

(54) ELECTRIC-MECHANICAL-ACOUSTIC-TRANSDUCER AND PORTABLE COMMUNICATION DEVICE INCLUDING THE SAME

(75) Inventors: Sawako Usuki, Hyogo (JP); Shuji Saiki, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 545 days.

(21) Appl. No.: 10/200,918

(22) Filed: Jul. 23, 2002

(65) Prior Publication Data

US 2003/0022702 A1 Jan. 30, 2003

(30) Foreign Application Priority Data

Jul. 25, 2001 (JP) ............................ 2001-224125

(51) Int. Cl.
*H04B 1/38* (2006.01)
*H04M 1/00* (2006.01)

(52) U.S. Cl. ................ 455/567; 455/550.1; 455/575.1; 340/388.4; 379/373

(58) Field of Classification Search ................ 455/567, 455/414.1, 425, 550.1, 575.1, 95; 450/30, 450/280, 323, 334
See application file for complete search history.

(56) References Cited

U.S. PATENT DOCUMENTS

| | | | | | |
|---|---|---|---|---|---|
| 4,242,541 | A * | 12/1980 | Ando | 381/99 |
| 5,117,403 | A * | 5/1992 | Eberl et al. | 367/175 |
| 5,261,006 | A * | 11/1993 | Nieuwendijk et al. | 381/353 |
| 5,528,697 | A | 6/1996 | Saito | |
| 6,208,237 | B1 * | 3/2001 | Saiki et al. | 340/388.1 |
| 6,259,935 | B1 * | 7/2001 | Saiki et al. | 455/567 |
| 6,385,328 | B1 * | 5/2002 | Yoo et al. | 381/412 |
| 6,404,896 | B1 * | 6/2002 | Yoo et al. | 381/401 |

FOREIGN PATENT DOCUMENTS

| | | | |
|---|---|---|---|
| CN | 1270489 | A | 10/2000 |
| EP | 0 970 758 | A1 | 1/2000 |
| EP | 1 045 613 | A2 | 10/2000 |
| EP | 1 063 020 | A1 | 12/2000 |
| JP | 58-218296 | | 12/1983 |
| JP | 61 018295 | A | 1/1986 |
| JP | 5-85192 | | 11/1993 |
| WO | WO 00 32013 | | 6/2000 |

OTHER PUBLICATIONS

Chinese Office Action dated Nov. 28, 2003 (4 pages).
European Search Report dated Mar. 9, 2004 (3 pages).

* cited by examiner

*Primary Examiner*—Tony T. Nguyen
(74) *Attorney, Agent, or Firm*—RatnerPrestia

(57) ABSTRACT

An electric-mechanical-acoustic-transducer includes a diaphragm; a movable section; a driving section for generating a driving force for vibrating the diaphragm and the movable section; and a suppression section for suppressing a sharpness (Q factor) of a vibration force obtained by the vibration of the movable section.

16 Claims, 11 Drawing Sheets

ELECTRIC-MECHANICAL-ACOUSTIC-TRANSDUCER AND PORTABLE COMMUNICATION DEVICE INCLUDING THE SAME

BACKGROUND OF THE INVENTION

1. Field of the Invention

The present invention relates to an electric-mechanical-acoustic-transducer for generating a mechanical vibration or a sound from an electric signal, and a portable communication device including the electric-mechanical-acoustic-transducer.

2. Description of the Related Art

Conventionally, a cellular phone includes both a sound generator for generating a bell sound or a melody, and a micromotor for generating a mechanical vibration, as means for informing the user of a call arrival. The conventional cellular phone further needs a sound receiving speaker (i.e., a receiver) for reproducing a received sound.

In order to reduce the size and weight, and also to reduce the number of components, of a portable communication device such as a cellular phone, a mechanism for providing two functions of sound generation and mechanical vibration generation with one electric-mechanical-acoustic-transducer is proposed (Japanese Laid-Open Utility Model Publication No. 5-85192).

FIG. 10 is a cross-sectional view of such a conventional electric-mechanical-acoustic-transducer 5000. As shown in FIG. 10, the electric-mechanical-acoustic-transducer 5000 includes a circular diaphragm 1. An outer periphery of the diaphragm 1 is attached to a case 2. The case 2 includes a bottom plate 5, and a yoke 3 is attached to the bottom plate 5. A suspension 6 is supported by the case 2, and a magnet 4 is supported by the suspension 6.

A voice coil 7 is inserted into a magnetic gap formed between an inner circumferential surface of the yoke 3 and an outer circumferential surface of the magnet 4. One end of the voice coil 7 is fixed to the diaphragm 1. The yoke 3 and the magnet 4 are included in a magnetic circuit, and the suspension 6 and the magnet 4 are included in a mechanical vibration system.

The electric-mechanical-acoustic-transducer 5000 having the above-described structure operates as follows. When an electric signal is applied to the voice coil 7, action-reaction forces act on the voice coil 7 and the magnetic circuit. Assuming that an action force acts on the voice coil 7, the action force vibrates the diaphragm 1, to which the voice coil 7 is attached, and thus a sound is generated.

A reaction force acting on the magnetic circuit vibrates the magnet 4 supported by the suspension 6. The vibration is conveyed to the case 2 via the suspension 6. Thus, the case 2 is vibrated.

The electric-mechanical-acoustic-transducer 5000 has the following problem.

The suspension 6 is formed of a material having a small internal loss, such as, for example, a leaf spring. Therefore, the sharpness (Q factor) of the mechanical vibration at a resonance frequency is increased. FIG. 11 shows a frequency characteristic of a mechanical vibration force generated by a vibration of the magnet 4 with a chain line 300.

Where the resonance frequency of the mechanical vibration system is $f_0$, and frequencies at which a mechanical vibration force having a value lower by 3 dB than the value of the mechanical vibration force at the resonance frequency $f_0$ are $f_1$ and $f_2$, the sharpness (Q factor) $Qf_0$ is represented by expression (1).

$$Qf_0=f_0/(f_2-f_1) \quad (1)$$

In the electric-mechanical-acoustic-transducer 5000, the sharpness (Q factor) of the mechanical vibration force at the resonance frequency of the mechanical vibration system is large. Therefore, the resonance frequency of the mechanical vibration system changes in accordance with a change in use conditions of a cellular phone (e.g., the way the user holds the cellular phone or the way the user positions the cellular phone). When the frequency of an input signal and the resonance frequency are deviated from each other even slightly, the mechanical vibration force is decreased to the extent that a sufficient vibration is not provided. In order to solve this problem, it is conceivable to additionally provide a circuit for constantly tracking the resonance frequency and thus changing the frequency of the input signal. Such a circuit undesirably enlarges the scale of the system.

SUMMARY OF THE INVENTION

According to one aspect of the invention, an electric-mechanical-acoustic-transducer includes a diaphragm; a movable section; a driving section for generating a driving force for vibrating the diaphragm and the movable section; and a suppression section for suppressing a sharpness (Q factor) of a vibration force obtained by the vibration of the movable section.

In one embodiment of the invention, the movable section includes a magnetic circuit for supplying a magnetic flux to the driving section.

In one embodiment of the invention, the movable section further includes a weight integrated with the magnetic circuit.

In one embodiment of the invention, the movable section is provided so as to face the diaphragm. The suppression section is an elastic member provided oppositely to the diaphragm with respect to the movable section.

In one embodiment of the invention, the elastic member is a sponge.

In one embodiment of the invention, the elastic member is a spring.

In one embodiment of the invention, the electric-mechanical-acoustic-transducer further includes a supporting section for supporting the diaphragm. The suppression section includes a first magnet provided oppositely to the diaphragm with respect to the movable section which faces the diaphragm, and a second magnet provided in contact with the supporting section so as to face the first magnet and magnetized oppositely to the first magnet.

In one embodiment of the invention, the suppression section is a suspension for supporting the movable section. The suspension is formed of a material having an internal loss coefficient equal to or greater than 0.01.

In one embodiment of the invention, the suppression section is a suspension for supporting the movable section. The suspension is formed of a composite material containing a polymeric material having a high viscosity.

In one embodiment of the invention, the suppression section is a suspension for supporting the movable section. The suspension is formed of a dislocation-type vibration damping alloy.

In one embodiment of the invention, the suppression section is a suspension for supporting the movable section. The suspension is formed of a laminate material containing at least two materials having different internal loss coefficients layered on each other.

In one embodiment of the invention, the suspension is formed of a damping steel plate formed of a laminate material containing a metal and a resin layered on each other.

In one embodiment of the invention, the suspension is formed of a vibration damping alloy which is a laminate material containing at least two metals layered on each other.

In one embodiment of the invention, the electric-mechanical-acoustic-transducer further comprises a supporting section for supporting the diaphragm. The supporting section and the diaphragm have a space therebetween. The electric-mechanical-acoustic-transducer further comprises a dividing section, coupled to the movable section and the supporting section, for dividing the space into two. The supporting section has at least one air hole for communicating a space between the dividing section and the supporting section to an outside of the electric-mechanical-acoustic-transducer. The suppression section includes the dividing section, the supporting section and the at least one air hole.

According to another aspect of the invention, a portable communication device includes a housing; and an electric-mechanical-acoustic-transducer provided in the housing. The electric-mechanical-acoustic-transducer includes a diaphragm, a movable section, a driving section for generating a driving force for vibrating the diaphragm and the movable section, and a suppression section for suppressing a sharpness (Q factor) of a vibration force obtained by the vibration of the movable section. The housing has a sound hole for releasing a sound generated by the electric-mechanical-acoustic-transducer.

Thus, the invention described herein makes possible the advantages of providing an electric-mechanical-acoustic-transducer for stably providing a sufficient magnitude of mechanical vibration force even under a change of use conditions, and a portable communication device including such an electric-mechanical-acoustic-transducer.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
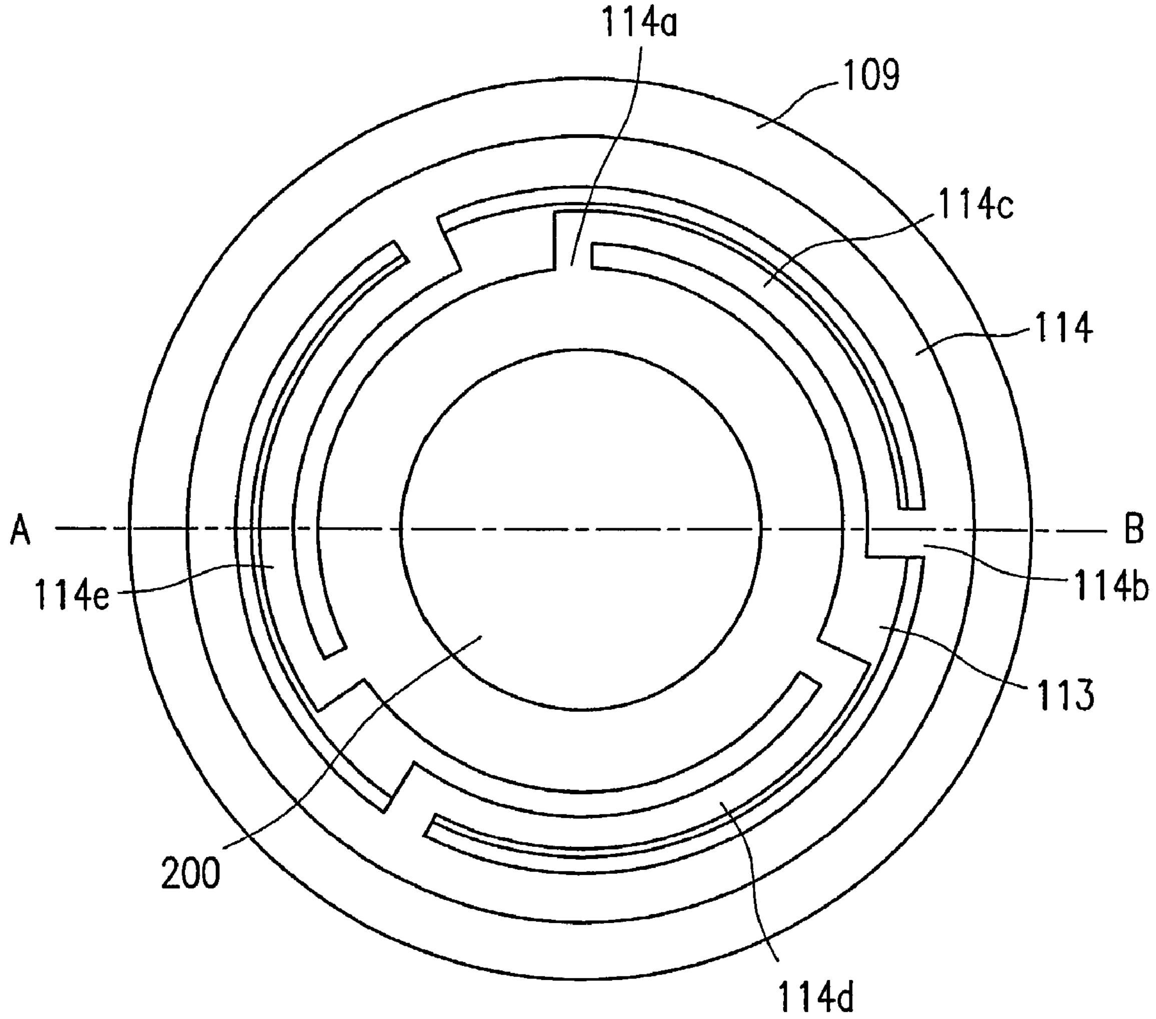
FIG. 1 is a plan view of an electric-mechanical-acoustic-transducer according to a first example of the present invention.
Figure 2:
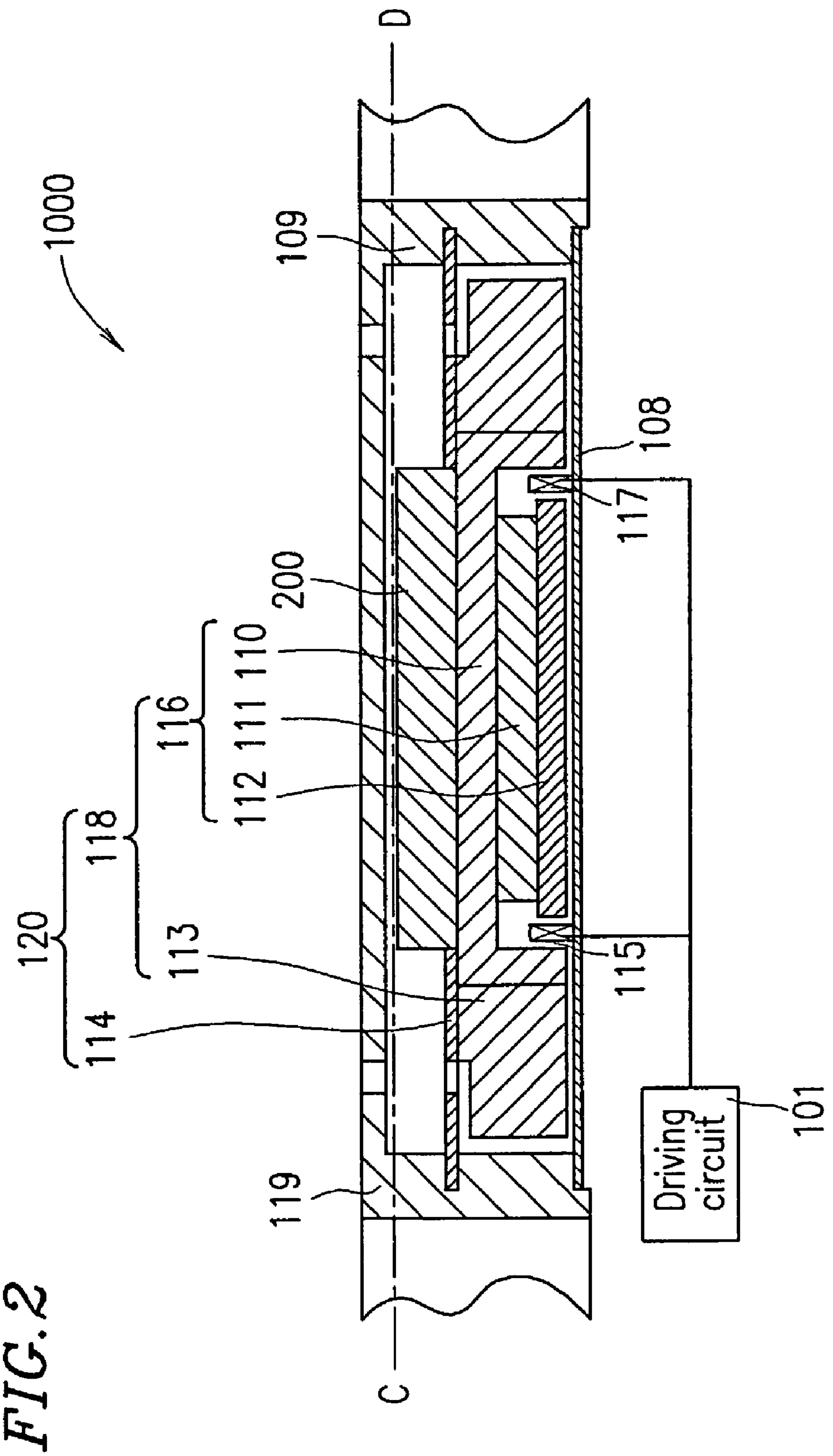
FIG. 2 is a cross-sectional view of the electric-mechanical-acoustic-transducer shown in FIG. 1.

FIGS. 1 and 2 show an electric-mechanical-acoustic-transducer 1000 according to a first example of the present invention. FIG. 1 is a plan view of the electric-mechanical-acoustic-transducer 1000 taken along a chain line C–D in FIG. 2. FIG. 2 is a cross-sectional view of the electric-mechanical-acoustic-transducer 1000 taken along a chain line A–B in FIG. 1.

As shown in FIGS. 1 and 2, the electric-mechanical-acoustic-transducer 1000 includes a diaphragm 108, a movable section 118 facing the diaphragm 108, a suspension 114 for supporting the movable section 118, a supporting section 109 for supporting a periphery of the diaphragm 108 and the suspension 114, a voice coil 117 for generating a driving force for vibrating the diaphragm 108 and the movable section 118, and a suppression section 200 for suppressing the sharpness (Q factor) of a mechanical vibration force generated by the vibration of the movable section 118.

The diaphragm 108, which is circular, is formed of a nonmagnetic material, for example, a resin material such as titanium or polycarbonate. The diaphragm 108 has a thickness of, for example, about 10 μm to 50 μm. The supporting section 109, which is cup-shaped, is formed of a resin material such as, for example, plastics. The supporting section 109 may include at least two components so as to sandwich the suspension 114 therebetween. The supporting section 109 is fixed to a housing 119 of, for example, a portable communication device.

The movable section 118 includes a magnetic circuit 116 and a weight 113, and relatively operates with respect to the supporting section 109. The magnetic circuit 116 includes a yoke 110, a magnet 111 and a plate 112. The yoke 110, which is cup-shaped, is formed of a ferromagnetic material, for example, soft iron. The magnet 111, which is circular, is a permanent magnet formed of, for example, a rare earth metal (e.g., Nd—Fe—B). The plate 112, which is circular, is formed of a ferromagnetic material, for example, soft iron, and is provided on a surface of the magnet 111 facing the diaphragm 108. A magnetic gap 115 is formed between an inner circumferential surface of the yoke 110 and an outer circumferential surface of the plate 112. The weight 113 may be integrated with the yoke 110. By adding the weight 113 to the yoke 110 so as to increase the mass of the movable section 118, a large mechanical vibration force is provided. The yoke 110 and the magnet 111 are fixed together by, for example, an adhesive. The magnet 111 and the plate 112 are also fixed together by, for example, an adhesive. The suspension 114 and the movable section 118 are included in a mechanical vibration system 120.

The suppression section 200 is circular and is formed of, for example, an elastic member such as a sponge or a spring. The suppression section 200 is provided on the movable section 118, oppositely to the diaphragm 118 with respect to the movable section 118. In the first example shown in FIGS. 1 and 2, the suppression section 200 is provided on the yoke 110 of the magnetic circuit 116, and vibrates together with the movable section 118.

The voice coil 117, which is cylindrical, is inserted into the magnetic gap 115, and one end of the voice coil 117 is attached to the diaphragm 108. The magnetic circuit 116 supplies a magnetic flux to the voice coil 117. The voice coil 117 is connected to a driving circuit 101 and acts as a driving section for generating a driving force for vibrating the diaphragm 108 and the movable section 118.

The suspension 114 includes three arc-shaped arms 114*c*, 114*d* and 114*e* extending in a circumferential direction of the suspension 114. One end 114*a* of each arm is fixed to the yoke 110 and the weight 113, and the other end 114*b* of each arm is fixed to the supporting section 109. As the number of arms of the suspension 114, two is sufficient but three is desirable in order to prevent rolling of the magnetic circuit 116. The suspension 114 is formed of, for example, stainless steel which has properties of a spring.

The electric-mechanical-acoustic-transducer 1000 operates, for example, as follows.

The driving circuit 101 is, for example, a received signal processing circuit of a portable communication device. When an AC electric signal is applied to the voice coil 117 from the driving circuit 101, action and reaction forces act on the voice coil 117 and the magnetic circuit 116. Assuming that a reaction force acts on the magnetic circuit 116, the reaction force is added to the movable section 118 supported by the suspension 114, thereby vibrating the movable section 118. In the case where, for example, the resonance frequency of the mechanical vibration system 120 including the suspension 114 and the movable section 118 is 150 Hz, the movable section 118 vibrates so as to generate a mechanical vibration force when the electric signal includes a frequency equal to or lower than 200 Hz, and the diaphragm 108 vibrates so as to generate a sound when the electric signal includes a frequency higher than 200 Hz. Especially when the frequency of the electric signal applied to the voice coil 117 matches the resonance frequency of the mechanical vibration system 120, a large mechanical vibration force is generated. The mechanical vibration force generated in the movable section 118 is conveyed to the supporting section 109 via the suspension 114, and thus the supporting section 109 and the housing 119 to which the supporting section 109 is fixed are vibrated. The electric-mechanical-acoustic-transducer 1000 has both the functions of generating a mechanical vibration and generating a sound.

The suppression section 200 is located between the supporting section 109 and the magnetic circuit 116. Therefore, when the movable section 118 tends to drastically vibrate, for example, when the frequency of the electric signal matches the resonance frequency of the mechanical vibration system 120, the suppression section 200 is compressed between the supporting section 109 and the magnetic circuit 116, so as to suppress the mechanical vibration force.

Figure 3:
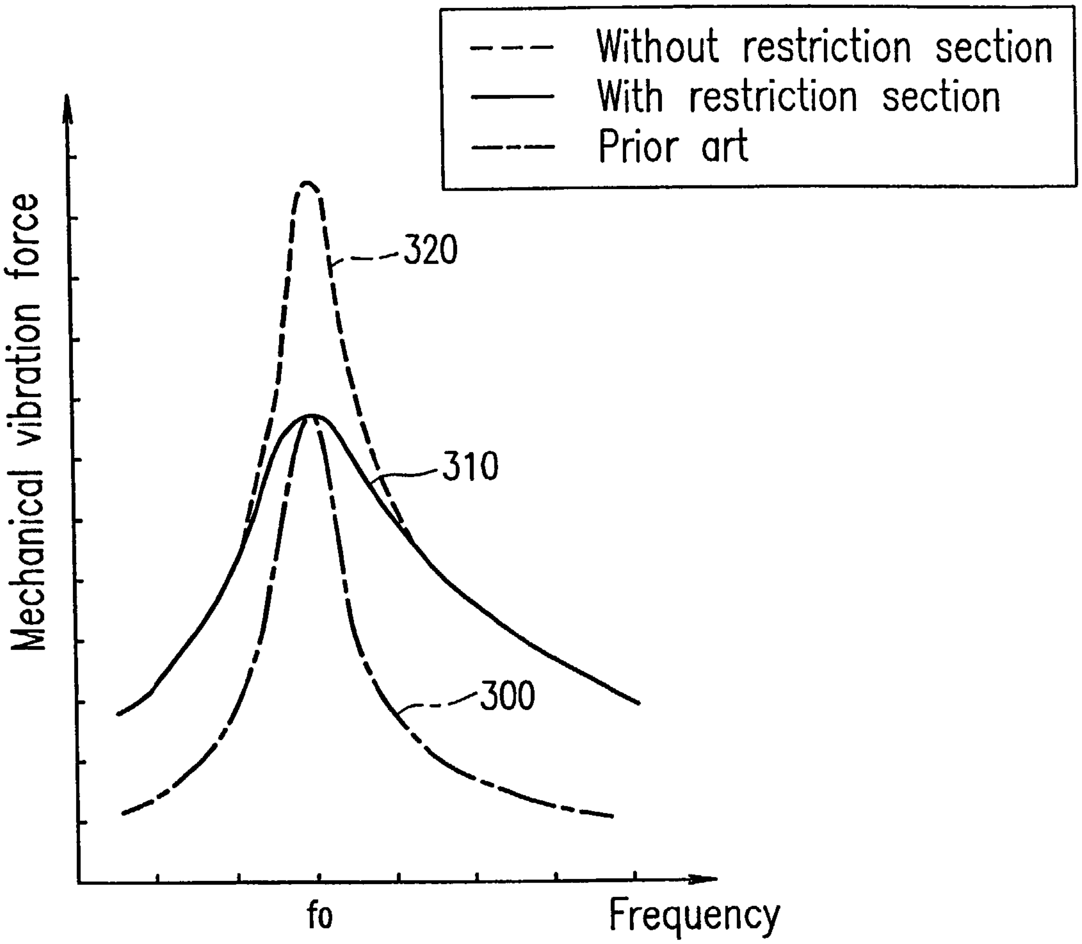
FIG. 3 is a graph illustrating frequency characteristics of mechanical vibration forces.
Figure 11:
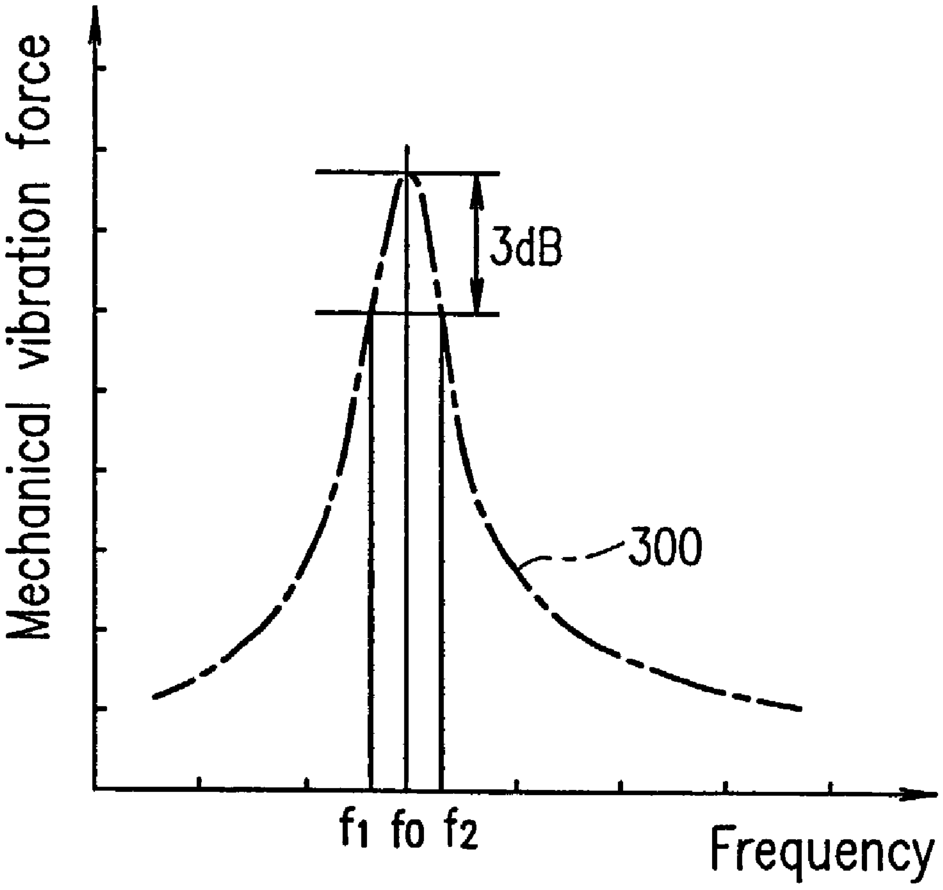
FIG. 11 is a graph illustrating a frequency characteristic of a mechanical vibration force in the electric-mechanical-acoustic-transducer shown in FIG. 10.

FIG. 3 shows frequency characteristics of mechanical vibration forces generated by the vibration of the movable sections. The larger the mechanical vibration force is, the more drastically the movable section 118 vibrates. A solid line 310 represents a frequency characteristic of a mechanical vibration force generated in the electric-mechanical-acoustic-transducer 1000 including the suppression section 200. A dashed line 320 represents a frequency characteristic of a mechanical vibration force generated in an electric-mechanical-acoustic-transducer which is identical with the electric-mechanical-acoustic-transducer 1000 other than it does not include the suppression section 200. A chain line 300 represents a frequency characteristic of a mechanical vibration force generated in the conventional electric-mechanical-acoustic-transducer 5000 shown in FIG. 11.

In the electric-mechanical-acoustic-transducer which is otherwise identical with the electric-mechanical-acoustic-transducer 1000 but does not include the suppression section 200, the sharpness (Q factor) of the mechanical vibration force at the resonance frequency $f_0$ is increased as shown in FIG. 3. In the electric-mechanical-acoustic-transducer 1000 including the suppression section 200, the suppression section 200 suppresses the vibration of the movable section 118 despite the tendency of the movable section 118 to vibrate drastically. Namely, the sharpness (Q factor) of the mechanical vibration force at the resonance frequency $f_0$ is suppressed to be small by the suppression section 200. Since the decrease in sharpness (Q factor) reduces the ratio of a change in the mechanical vibration force with respect to the frequency of the mechanical vibration force, the dispersion in the mechanical vibration force accompanying the change in the resonance frequency $f_0$ can be small, the change being caused in accordance with the use conditions.

Figure 10:
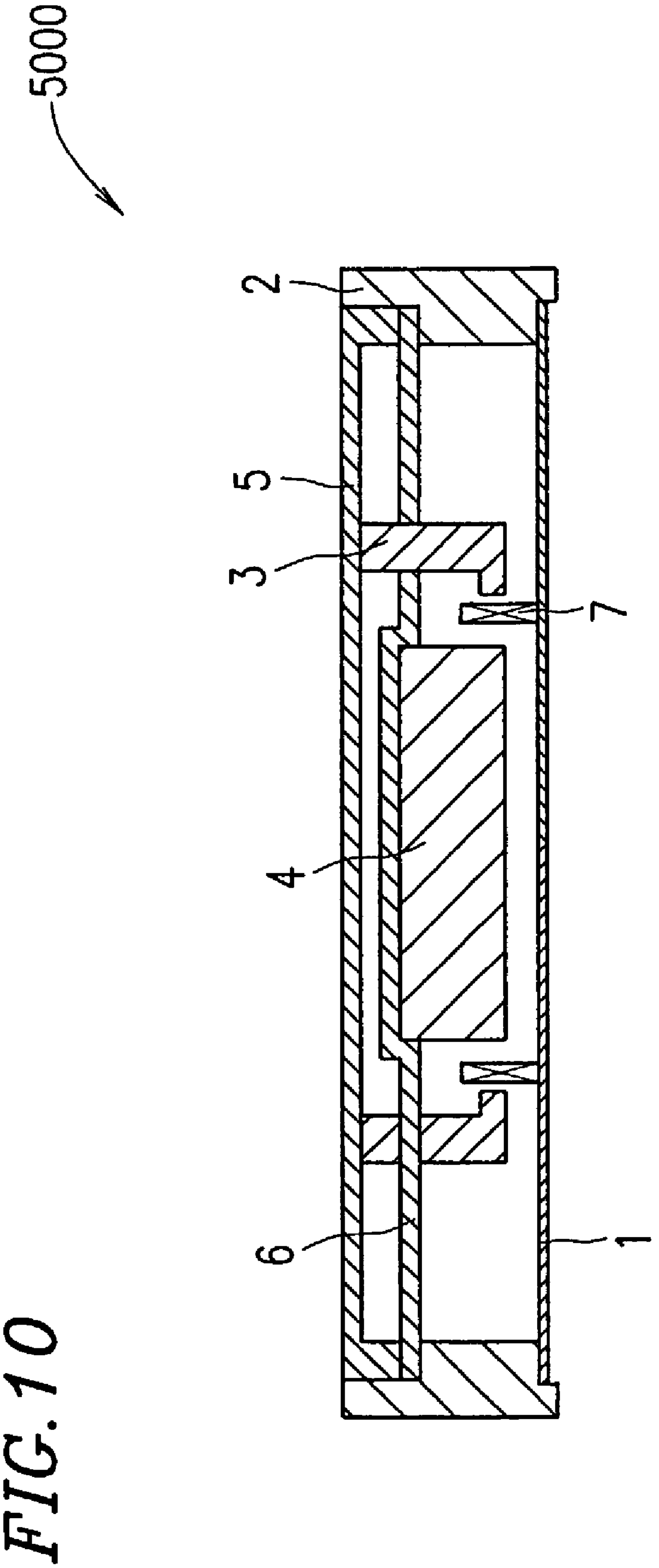
FIG. 10 is across-sectional view of a conventional electric-mechanical-acoustic-transducer.

A maximum value of the mechanical vibration force of the electric-mechanical-acoustic-transducer 1000 including the suppression section 200 is smaller than a maximum value of the mechanical vibration force of the electric-mechanical-acoustic-transducer without the suppression section 200 (i.e., the electric-mechanical-acoustic-transducer represented by the dashed line 320). Therefore, in order to provide a sufficient mechanical vibration force, the current value of the electric signal applied to the voice coil 117 from the driving circuit 101 is preferably larger than the current value of the electric signal applied to the voice coil 7 of the conventional electric-mechanical-acoustic-transducer 5000 (FIG. 10). By increasing the current value of the electric signal applied to the voice coil 117, a desirable magnitude of mechanical vibration force is provided even in a state where the sharpness (Q factor) of the mechanical vibration force is suppressed by the suppression section 200. For example, the current value of the electric signal can be set such that the maximum value of the mechanical vibration force of the electric-mechanical-acoustic-transducer 1000 including the suppression section 200 matches the maximum value of the mechanical vibration force of the conventional electric-mechanical-acoustic-transducer 5000 as shown in FIG. 3. In this manner, a desirable magnitude of mechanical vibration force can be provided.

As described above, in the first example, the suppression section 200 decreases the sharpness (Q factor) of the mechanical vibration force. Thus, the frequency band in which the movable section 118 can be vibrated so as to provide a sufficient magnitude of mechanical vibration force is enlarged. As a result, even when the resonance frequency of the movable section 118 is changed in accordance with the use conditions (i.e., even when the frequency of the electric signal does not match the resonance frequency of the mechanical vibration system 120), a sufficient magnitude of mechanical vibration force is stably provided.

Owing to the suppression section 200, the electric-mechanical-acoustic-transducer 1000 can decrease the sharpness (Q factor) of the mechanical vibration force.

The suppression section 200 also acts as an alleviator against an impact such as a drop or the like, so as to prevent the movable section 118 from being broken. The suppression section 200 can also prevent the moving section 118 from colliding against the supporting section 109.

In the first example, the suppression section 200 is fixed to the magnetic circuit 116. Substantially the same effect is provided even when the suppression section 200 is fixed to a surface of the supporting section 109 facing the magnetic circuit 116.

In the first example, the movable section 118 includes the magnetic circuit 116 and the weight 113. In the case where a sufficient magnitude of mechanical vibration force is obtained from the magnetic circuit 116, the weight 113 may be eliminated from the movable section 118.

EXAMPLE 2

Figure 4:
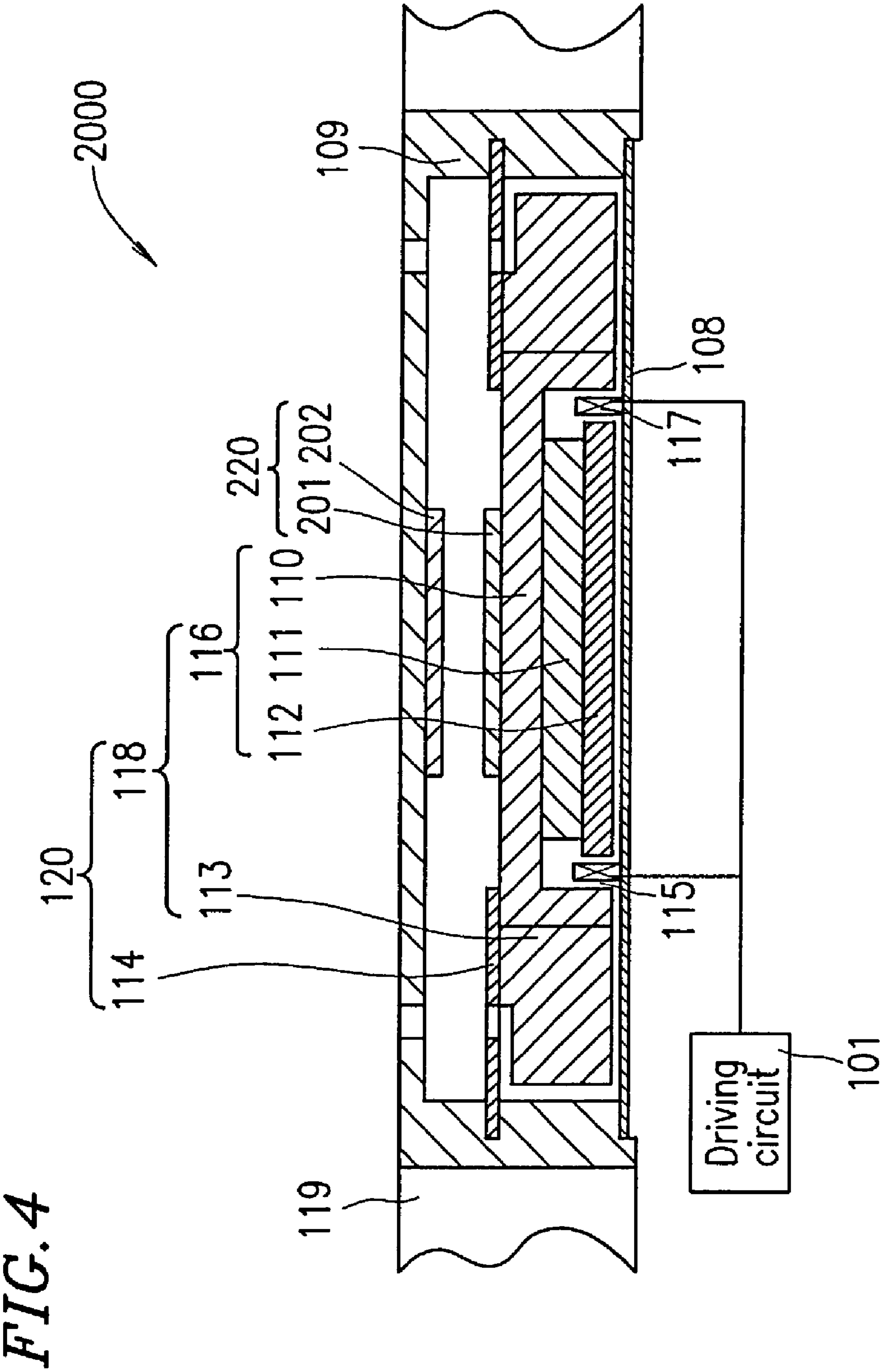
FIG. 4 is a cross-sectional view of an electric-mechanical-acoustic-transducer according to a second example of the present invention.

FIG. 4 is a cross-sectional view of an electric-mechanical-acoustic-transducer 2000 according to a second example of the present invention. Unlike the electric-mechanical-acoustic-transducer 1000 (FIGS. 1 and 2), the electric-mechanical-acoustic-transducer 2000 includes a suppression section 220 instead of the suppression section 200. The suppression section 220 includes a first magnet 201 and a second magnet 202. The other elements of the electric-mechanical-acoustic-transducer 2000 are substantially the same as those of the electric-mechanical-acoustic-transducer 1000.

Figure 5A:
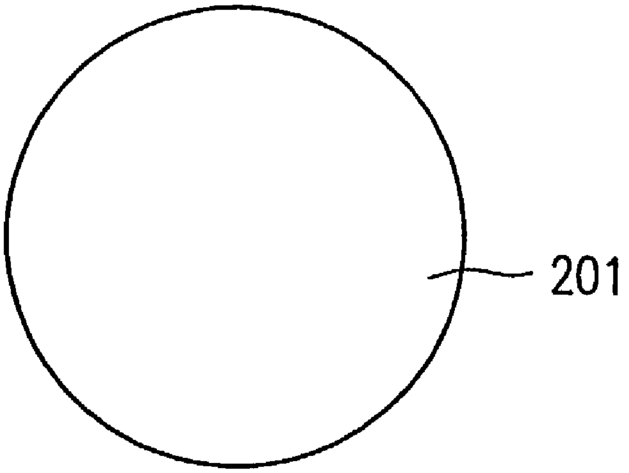
FIGS. 5A and 5B are respectively plan views of first and second magnets of the electric-mechanical-acoustic-transducer shown in FIG. 4.
Figure 5B:
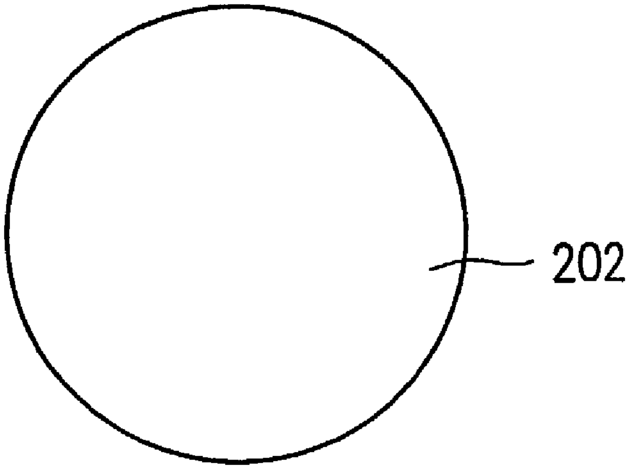

The first magnet 201 is provided on a surface of the movable section 118 opposite to the diaphragm 108. In the second example, the first magnet 201 is provided on the yoke 110. The second magnet 202 is provided on a surface of the supporting section 109 facing the first magnet 201. The first magnet 201 and the second magnet 202 are magnetized oppositely to each other such that the first magnet 201 and the second magnet 202 repulse each other. FIGS. 5A and 5B are respectively plan views of the first magnet 201 and the second magnet 202. The first magnet 201 and the second magnet 202 are, for example, permanent magnets formed of, for example, a rare earth metal (e.g., Nd—Fe—B), and are cylindrical.

The electric-mechanical-acoustic-transducer 2000 operates, for example, as follows.

When an AC electric signal is applied to the voice coil 117 from the driving circuit 101, action and reaction forces act on the voice coil 117 and the magnetic circuit 116. A reaction force acting on the magnetic circuit 116 is applied to the movable section 118 supported by the suspension 114, thereby vibrating the movable section 118, like in the electric-mechanical-acoustic-transducer 1000 described in the first example. Also like in the electric-mechanical-acoustic-transducer 1000, when the frequency of the electric signal applied to the voice coil 117 matches the resonance frequency of the mechanical vibration system 120 including the suspension 114 and the movable section 118, the movable section 118 tends to drastically vibrate.

The electric-mechanical-acoustic-transducer 2000 includes the suppression section 220 instead of the suppression section 200 included in the electric-mechanical-acoustic-transducer 1000. The first magnet 201 and the second magnet 202 included in the suppression section 220 are magnetized oppositely and thus constantly have forces repulsing each other. When, for example, the frequency of the electric signal matches the resonance frequency of the mechanical vibration system 120 and as a result, the movable section 118 tends to drastically vibrate, the distance between the first magnet 201 and the second magnet 202 is shortened. Therefore, the repulsive forces are increased, which suppresses the vibration of the movable section 118. In other words, the sharpness (Q factor) of the mechanical vibration force is suppressed to be small by the suppression section 220. Thus, the frequency band in which the movable section 118 can be vibrated so as to provide a sufficient magnitude of mechanical vibration force is enlarged. As a result, even when the resonance frequency of the movable section 118 is changed in accordance with the use conditions, a sufficient magnitude of mechanical vibration force is stably provided.

In the second example, the first and second magnets 201 and 202 are formed of a rare earth metal. The first and second magnets 201 and 202 may be formed of ferrite or other materials as long as substantially the same effect is provided. In the second example, the first and second magnets 201 and 202 are cylindrical. The first and second magnets 201 and 202 may be ring-shaped, rectangular-parallelepiped or of any other shape as long as a sufficient repulsive force is provided. In the second example, the first and second magnets 201 and 202 have the same shape as shown in FIGS. 5A and 5B. The first and second magnets 201 and 202 may have different shapes.

In the second example, the second magnet 202 is provided on the supporting section 109. Instead, the second magnet 202 may be buried in the supporting section 109. The first magnet 201 may be buried in the yoke 110.

EXAMPLE 3

Figure 6:
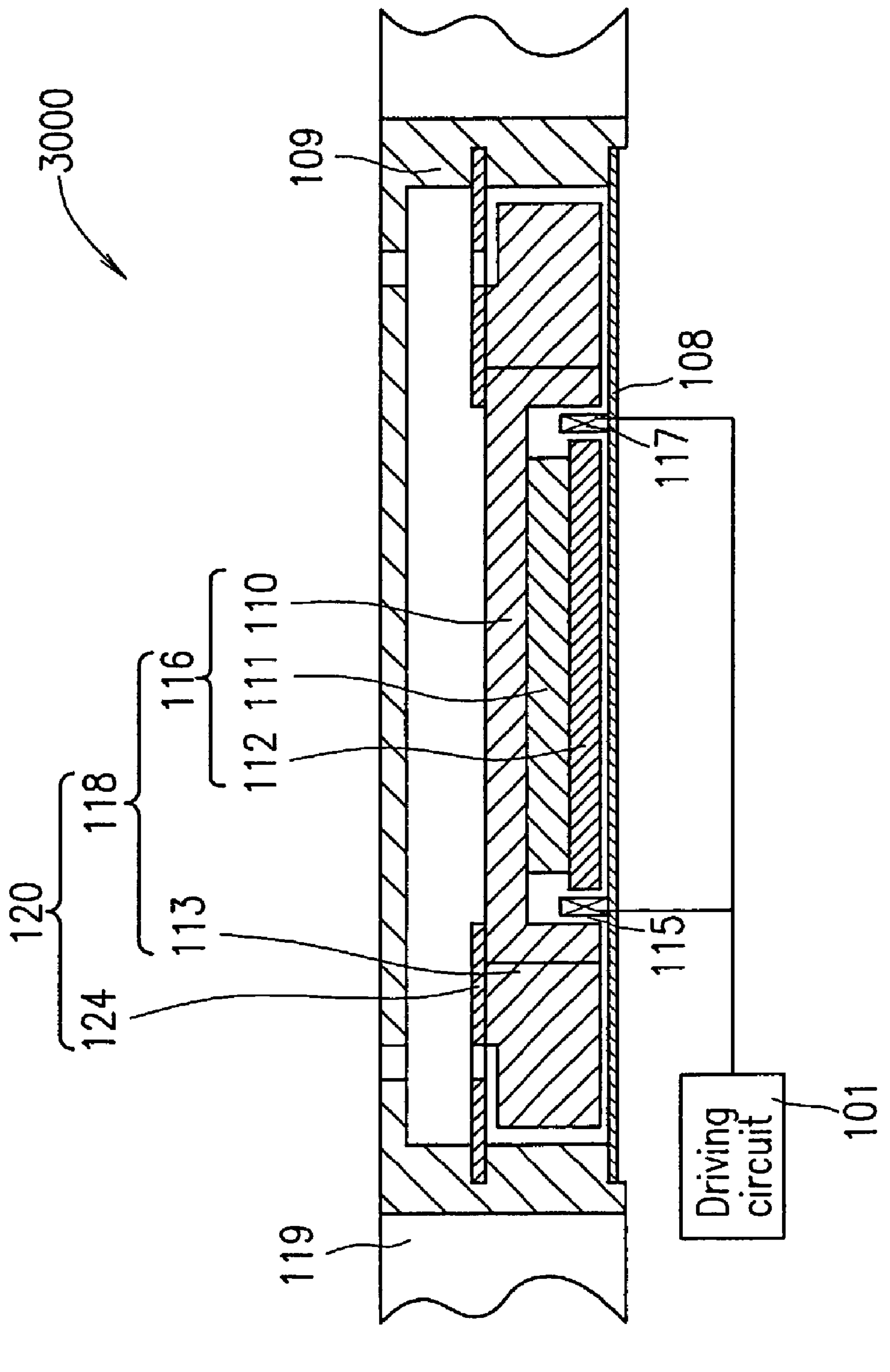
FIG. 6 is a cross-sectional view of an electric-mechanical-acoustic-transducer according to a third example of the present invention.

FIG. 6 is a cross-sectional view of an electric-mechanical-acoustic-transducer 3000 according to a third example of the present invention. Unlike the electric-mechanical-acoustic-transducer 1000 (FIGS. 1 and 2), the electric-mechanical-acoustic-transducer 3000 includes a suspension 124 instead of the suspension 114 and does not includes the suppression section 200. The suspension 124 supports the movable section 118 and also acts as a suppression section for suppressing the sharpness (Q factor) of a mechanical vibration force generated by the vibration of the movable section 118. The suspension 124 and the movable section 118 are included in a mechanical vibration system 125. The other elements of the electric-mechanical-acoustic-transducer 3000 are substantially the same as those of the electric-mechanical-acoustic-transducer 1000.

The suspension 124 supports the movable section 118. The suspension is preferably formed of a material having a high internal loss in response to the vibration of the mechanical vibration system 125 and thus attenuating the vibration. For example, the suspension 124 is formed of a composite material containing a polymeric material having a high viscosity (e.g., rubber). The suspension 124 has, for example, a three-layer structure of aluminum-rubber-aluminum. The suspension 124 has the same shape as that of the suspension 114 (FIGS. 1 and 2).

The electric-mechanical-acoustic-transducer 3000 operates, for example, as follows.

When an AC electric signal is applied to the voice coil 117 from the driving circuit 101, action and reaction forces act on the voice coil 117 and the magnetic circuit 116. A reaction force acting on the magnetic circuit 116 is applied to the movable section 118 supported by the suspension 124, thereby vibrating the movable section 118, like in the electric-mechanical-acoustic-transducer 1000 described in the first example. Also like in the electric-mechanical-acoustic-transducer 1000, when the frequency of the electric signal applied to the voice coil 117 matches the resonance frequency of the mechanical vibration system 125, the movable section 118 tends to drastically vibrate.

The electric-mechanical-acoustic-transducer 3000 includes the suspension 124 instead of the suspension 114, and does not include the suppression section 200, unlike the electric-mechanical-acoustic-transducer 1000 (FIGS. 1 and 2). As described above, the suspension is formed of a material having a high internal loss in response to the vibration of the mechanical vibration system 125 and thus attenuating the vibration. Therefore, when the movable section 118 tends to drastically vibrate, for example, when the frequency of the electric signal matches the resonance frequency of the mechanical vibration system 125, the suspension 124 having a high internal loss suppresses the vibration of the movable section 118. In other words, the sharpness (Q factor) of the mechanical vibration force is suppressed to be small by the suspension 124.

Owing to such a structure, the frequency band in which the movable section 118 can be vibrated so as to provide a sufficient magnitude of mechanical vibration force is enlarged, without providing the suppression section 200 (formed of, for example, an elastic member) described in the first example or the suppression section 220 (including the first magnet 201 and the second magnet 202) described in the second example. As a result, even when the resonance frequency of the movable section 118 is changed in accordance with the use conditions, a sufficient magnitude of mechanical vibration force is stably provided.

A metal, for example, aluminum, is used as the base material of the suspension 124. This provides an elastic force for allowing the suspension 124 to act as a supporting system.

In the third example, the suspension 124 is formed of a composite material (a three-layer structure of aluminum-rubber-aluminum) containing a polymeric material having a high viscosity. Instead, the suspension 124 may have a three-layer structure of aluminum-epoxy resin-aluminum or a three-layer structure of aluminum-acrylic resin-aluminum. The suspension 124 may also be formed of a material having a high internal loss such as, for example, polyether sulphone or polyarylate. The suspension 124 preferably has an internal loss coefficient of 0.01 or higher. The suspension 124 may be formed of magnesium or dislocation-type vibration damping alloys (for example, a magnesium-zirconium alloy), which absorbs vibration owing to the dislocation motion inside the metal. Alternatively, the suspension 124 may be formed of a laminate material containing at least two materials (for example, containing two layers: an aluminum-copper alloy and an aluminum-alloy composite material). When such a material is used, the sharpness (Q factor) of the mechanical vibration force can be suppressed by absorbing the mechanical vibration using friction at the interface between the different layers. The materials contained in such a laminate material usable for the suspension 124 have different internal loss coefficients from each other. The suspension 124 may be formed of a damping steel plate formed of a laminate damping material of a metal and a resin layered on each other. The suspension 124 may be formed of a vibration damping alloy which is a laminate material of at least two metals layered on each other.

The material of the suspension 124 is not limited to a laminate material. The suspension 124 may be formed of stainless steel as a base substrate, which is coated with a vibration damping material such as SBR (styrene butadiene rubber) or the like.

EXAMPLE 4

Figure 7:
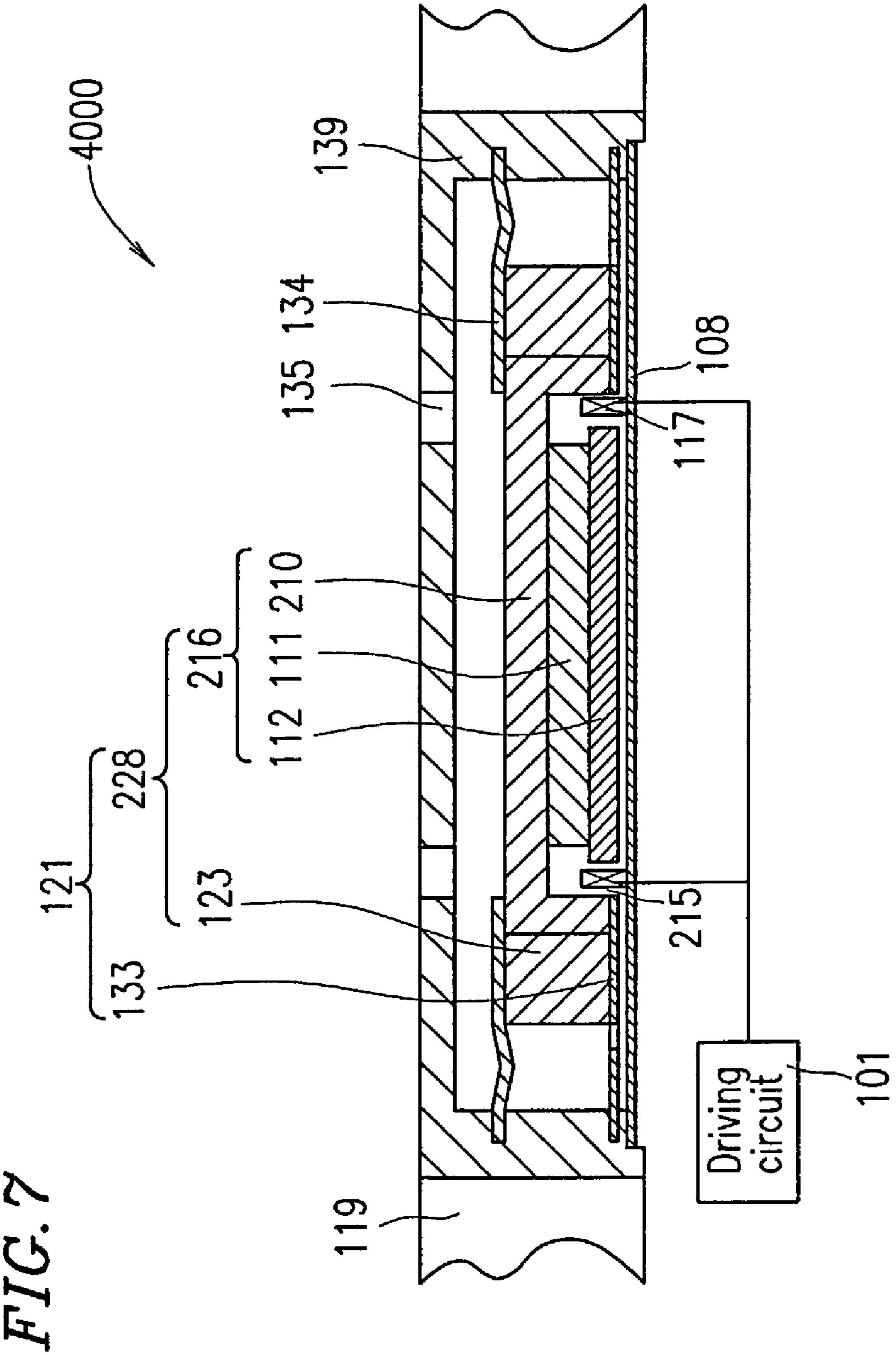
FIG. 7 is a cross-sectional view of an electric-mechanical-acoustic-transducer according to a fourth example of the present invention.

FIG. 7 is a cross-sectional view of an electric-mechanical-acoustic-transducer 4000 according to a fourth example of the present invention. The electric-mechanical-acoustic-transducer 4000 includes a diaphragm 108, a movable section 228 facing the diaphragm 108, a suspension 133 for supporting the movable section 228, a supporting section 139 for supporting a periphery of the diaphragm 108 and the suspension 133, a voice coil 117, and a partition 134 coupled to the movable section 228 and the supporting section 139.

The movable section 228 includes a magnetic circuit 216 and a weight 123, and relatively operates with respect to the supporting section 139. The magnetic circuit 216 includes a cup-shaped yoke 210, a magnet 111 and a plate 112. A magnetic gap 215 is formed between an inner circumferential surface of the yoke 210, which is ferromagnetic, and an outer circumferential surface of the plate 112. The weight 123 may be integrated with the yoke 210. The suspension 133 and the movable section 228 are included in a mechanical vibration system 121. The material and the shape of the suspension 133 are the same as those of the suspension 114 in the first example. The voice coil 117 generates a driving force for vibrating the diaphragm 108 and the movable section 228. The supporting section 139, which is cup-shaped, may include three components so as to sandwich the suspension 133 and the partition 134.

The partition 134 acts as a dividing section for dividing the space between the supporting section 139 and the diaphragm 108 into two. The partition 134 is annular with a cross-section having a ridge.

The supporting section 139 has at least one air hole 135 for communicating the space among the supporting section 139, the partition 134 and the yoke 210 with a space external to the electric-mechanical-acoustic-transducer 4000. For example, a plurality of circular air holes 135 may be formed in the supporting section 139. The partition 134, the supporting section 139, and the air holes 135 act together as a suppression section for suppressing the sharpness (Q factor) of the mechanical vibration force generated by the vibration of the movable section 228.

The electric-mechanical-acoustic-transducer 4000 operates, for example, as follows.

When an AC electric signal is applied to the voice coil 117 from the driving circuit 101, action and reaction forces act on the voice coil 117 and the magnetic circuit 216. A reaction force acting on the magnetic circuit 216 is applied to the movable section 228 supported by the suspension 133, thereby vibrating the movable section 228, like in the electric-mechanical-acoustic-transducer 1000 described in the first example. Also like in the electric-mechanical-acoustic-transducer 1000, when the frequency of the electric signal applied to the voice coil 117 matches the resonance frequency of the mechanical vibration system 121, the movable section 228 tends to drastically vibrate.

The electric-mechanical-acoustic-transducer 4000 includes the partition suspension 134 and does not include the suppression section 200, unlike the electric-mechanical-acoustic-transducer 1000 (FIGS. 1 and 2). When the movable section 228 is vibrated, the partition 134 is vibrated together with the movable section 228, thus compressing the air in the space between the partition 134 and the supporting section 139. The compressed air is released outside through the air holes 135. This movement of the air through the air holes 135 generates an acoustic resistance, and this acoustic resistance suppresses the vibration of the movable section 228. Namely, the acoustic resistance suppresses the mechanical vibration force generated by the vibration of the movable section 228, and thus suppresses the sharpness (Q factor) of the mechanical vibration force to be small.

Owing to such a structure, the frequency band in which the movable section 228 can be vibrated so as to provide a sufficient magnitude of mechanical vibration force is enlarged. As a result, even when the resonance frequency of the movable section 228 is changed in accordance with the use conditions, a sufficient magnitude of mechanical vibration force is stably provided. Since the movable section 228 is supported by the two elements, i.e., the suspension 133 and the partition 134, the movable section 228 is less likely to be rolled.

In the fourth example, the partition 134 has a cross-section having a ridge. Instead, the cross-section of the partition 134 may be, for example, wave-shaped, as long as the air is shielded by the partition 134 and room for vibration of the movable section 228 is guaranteed.

In the fourth example, the air holes 135 are circular. The shape and number of the air holes 135 are not specifically limited as long as substantially the same acoustic resistance is provided. The ratio at which the vibration of the movable section 228 is suppressed is changed in accordance with the shape and number of the movable section 228. This is usable for adjusting the frequency band in which the movable section 228 can be vibrated so as to provide a sufficient magnitude of mechanical vibration force.

The supporting section 139 may have an air hole for communicating the space above the diaphragm 108 to the outside of the electric-mechanical-acoustic-transducer 4000.

EXAMPLE 5

In a fifth example of the present invention, a cellular phone 61, as a portable communication device including an electric-mechanical-acoustic-transducer according to the present invention, will be described with reference to FIGS. 8 and 9.

Figure 8:
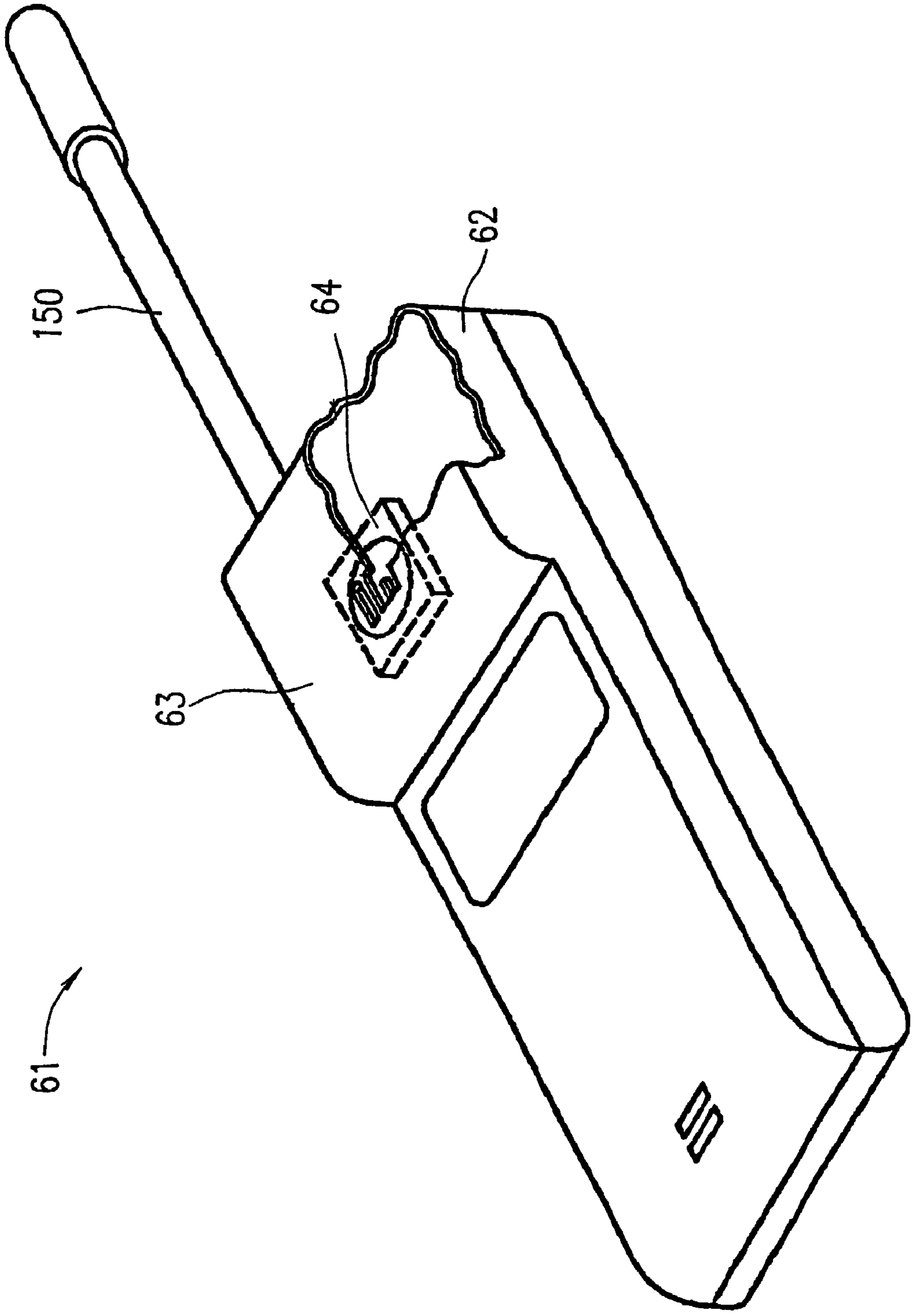
FIG. 8 is a partially-cutaway perspective view of a cellular phone according to a fifth example of the present invention.
Figure 9:
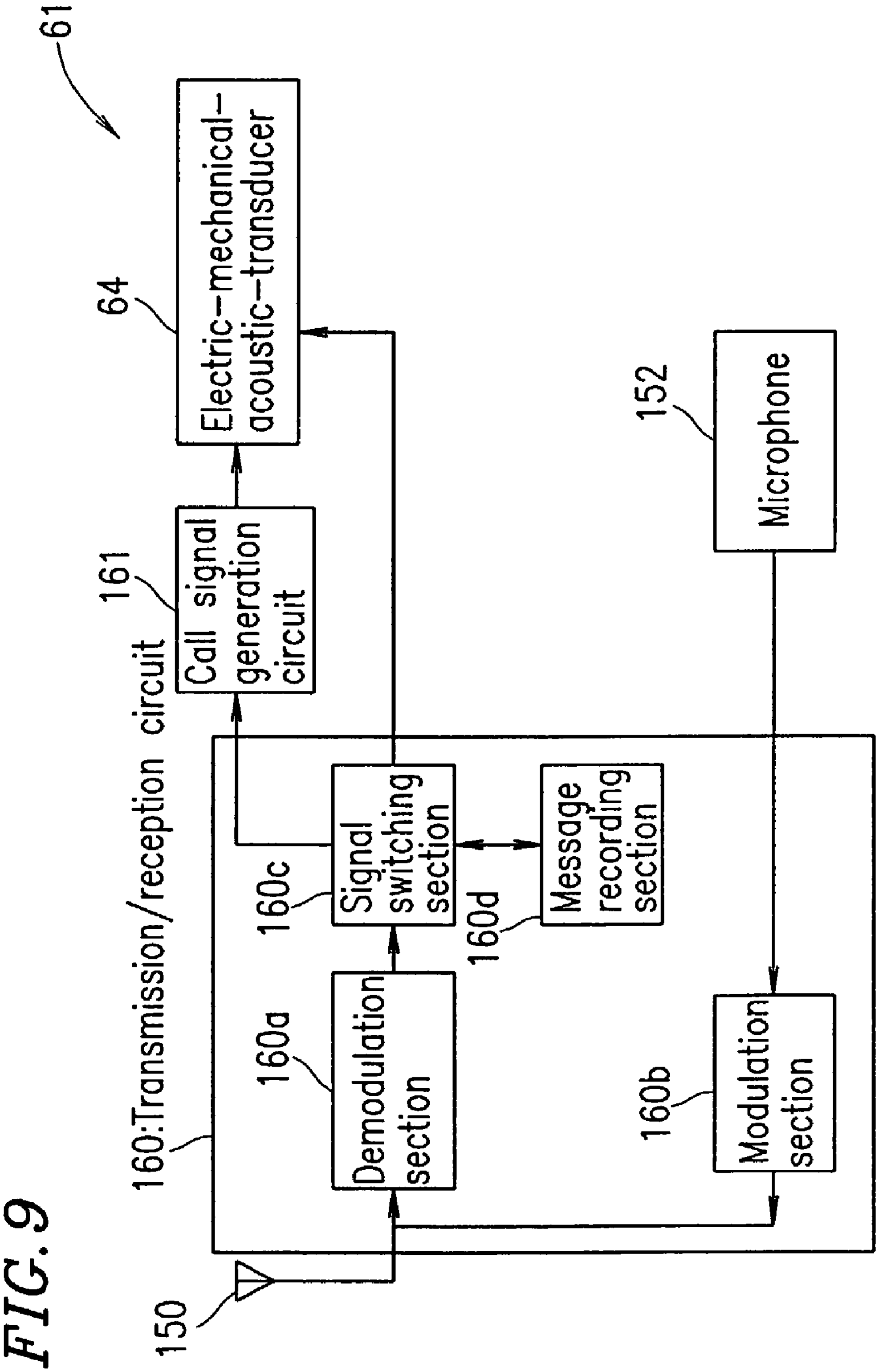
FIG. 9 is a block diagram illustrating a structure of the cellular phone shown in FIG. 8.

FIG. 8 is a partially-cutaway perspective view of the cellular phone 61, and FIG. 9 is a block diagram schematically illustrating a structure of the cellular phone 61.

The cellular phone 61 includes a housing 62 having a sound hole 63, and an electric-mechanical-acoustic-transducer 64. As the electric-mechanical-acoustic-transducer 64, any one of the electric-mechanical-acoustic-transducers 1000, 2000, 3000 and 4000 described in the first, second, third and fourth examples can be employed. In the housing 62, The electric-mechanical-acoustic-transducer 64 is provided such that the diaphragm 108 faces the sound hole 63.

As shown in FIG. 9, the cellular phone 61 further includes an antenna 150, a transmission/reception circuit 160, a call signal generation circuit 161, and a microphone 152. The transmission/reception circuit 160 includes a demodulation section 160*a,* a modulation section 160*b,* a signal switching section 160*c,* and a message recording section 160*d.*

The antenna 150 is used for receiving radiowaves which are output from a nearby base station and for transmitting radiowaves to the base station. The demodulation section 160*a* demodulates a modulated signal which has been input via the antenna 150, converts the demodulated signal into a received signal, and outputs the received signal to the signal switching section 160*c*. The signal switching section 160*c* is a circuit for performing one of a plurality of different signal processes depending on the contents of the received signal. When the received signal is a call arrival signal, the received signal is output to the call signal generation circuit 161. When the received signal is a voice signal, the received signal is output to the electric-mechanical-acoustic-transducer 64. When the received signal is a voice signal for message recording, the received-signal is output to the message recording section 160*d.* The message recording section 160*d* includes, for example, a semiconductor memory (not shown). Any recorded message which is left while the cellular phone 61 is ON is stored in the message recording section 160*d.* While the cellular phone 61 is in an out-of-service area or while the cellular phone 61 is OFF, any recorded message is stored in a memory device within the base station. The call signal generation circuit 161 generates a call signal, and outputs the call signal to the electric-mechanical-acoustic-transducer 64.

Like conventional cellular phones, the cellular phone 61 includes a small microphone 152 as an electro-acoustic transducer. The modulation section 160*b* modulates a dial signal and/or a voice signal which has been transduced by the microphone 152, and outputs the modulated signal to the antenna 150.

The cellular phone 61 having the above-described structure as a portable communication device operates, for example, as follows.

The radiowaves which are output from the base station are received by the antenna 150, and are demodulated by the demodulation section 160*a* into a base-band received signal. Upon determination that the received signal is a call arrival signal, the signal switching circuit 160*c* outputs the call arrival signal to the call signal generation circuit 161 in order to inform the user of the cellular phone 61 of the call arrival.

Upon receiving such a call arrival signal, the call signal generation circuit 161 outputs a call signal. When the cellular phone 61 is set to be in a "vibration only mode", the call signal is input as an electric signal including a frequency component which is close to the resonance frequency of the mechanical vibration system of the electric-mechanical-acoustic-transducer 64. As a result, the maximum possible vibration is provided by the mechanical vibration system, which drastically vibrates the supporting section. The vibration of the supporting section, in turn, vibrates the housing 62. The vibration of the housing 62 vibrates the entirety of the cellular phone 61. The user becomes aware of the call arrival by the vibration of the cellular phone 61. When the cellular phone 61 is set to be in a standard mode, the call signal includes a signal corresponding to a pure tone in the audible range or a signal corresponding to a complex sound of such pure tones. When such a call signal is input to the electric-mechanical-acoustic-transducer 64, the diaphragm of the electric-mechanical-acoustic-transducer 64 vibrates and generates a call arrival sound. The call arrival sound is output to the outside of the cellular phone 61 so as to inform the user of the call arrival.

Once the cellular phone 61 is put into a call reception mode, the signal switching circuit 160*c* performs a level adjustment of the received signal, and then outputs the received voice signal directly to the electric-mechanical-acoustic-transducer 64. The electric-mechanical-acoustic-transducer 64 operates as a receiver or a loudspeaker to reproduce the voice signal.

The voice of the user is detected by the microphone 152 and converted into a voice signal, which is then input to the modulation section 160*b.* The voice signal is modulated by the modulation section 160*b* and transduced into a predetermined carrier wave to be output via the antenna 150.

When the user sets the cellular phone 61 to a message recording mode and leaves the cellular phone 61 ON, any message transmitted to the cellular phone 61 is stored in the message recording section 160*d.* While the cellular phone 61 is OFF, any message directed to the cellular phone 61 is temporarily stored in the base station. When the user requests reproduction of the recorded message via a key operation, the signal switching circuit 160*c* complies with the request by retrieving the recorded message from the message recording section 160*d* or from the base station.

The voice signal is adjusted to an amplified level and output to the electric-mechanical-acoustic-transducer 64. The electric-mechanical-acoustic-transducer 64 operates as a receiver or a loudspeaker to reproduce the recorded message.

As described above, according to the present invention, one electric-mechanical-acoustic-transducer is sufficient for a cellular phone, as opposed to a conventional cellular phone requiring a plurality of acoustic components. The resonance frequency of the mechanical vibration system changes in accordance with use conditions of the cellular phone, for example, the way the user holds the cellular phone or the way the user positions the cellular phone. An electric-mechanical-acoustic-transducer according to the present invention can maintain the magnitude of vibration of the cellular phone that the user feels regardless of such different use conditions, since the sharpness (Q factor) of the electric-mechanical-acoustic-transducer is small.

The magnitude of vibration felt by the user depends on the frequency band. The magnitude is higher in a lower frequency band equal to or lower than 200 Hz. The sensitivity of the user is high to the frequency of 130 Hz and the vicinity thereof. Therefore, the resonance frequency of the mechanical vibration system is preferably designed to be 130 Hz or in the vicinity thereof. For reproducing voice or music signals, the reproduction frequency band is preferably equal to or higher than 200 Hz.

The cellular phone 61 includes the electric-mechanical-acoustic-transducer 64 directly attached to the housing 62. Instead, the electric-mechanical-acoustic-transducer 64 may be attached to a substrate built in the cellular phone 61. The electric-mechanical-acoustic-transducer 64 may be provided so as to face the sound hole 63 via an acoustic port. The electric-mechanical-acoustic-transducer 64 may be attached to a different type of cellular phone. The electric-mechanical-acoustic-transducer 64 still operates in substantially the same manner and provides substantially the same effect.

In the fifth example, the cellular phone is described as an example of the portable communication device. The present invention is applicable to any portable communication device which can include an electric-mechanical-acoustic-transducer, for example, a beeper, a notebook computer, a PDA, and a wristwatch.

As described above, the present invention provides an electric-mechanical-acoustic-transducer including a suppression section for suppressing the sharpness (Q factor) of a mechanical vibration force which is generated by a vibration of a movable section of the electric-mechanical-acoustic-transducer. The suppression section suppresses the sharpness (Q factor) to be small. Owing to such a system, the frequency band, in which the movable section can be vibrated so as to provide a sufficient magnitude of mechanical vibration force, is enlarged. As a result, even when the resonance frequency of the movable section is changed in accordance with the use conditions, a sufficient magnitude of mechanical vibration force is stably provided.

Since the driving section vibrates the movable section and the diaphragm, both a mechanical vibration and a sound can be generated.

A portable communication device including an electric-mechanical-acoustic-transducer according to the present invention has functions of (i) informing the user of a call arrival by a mechanical vibration, (ii) informing the user of a call arrival by a sound, and (iii) reproducing a received sound such as a voice. According to the present invention, a portable communication device generates both a mechanical vibration and a sound with only one electric-mechanical-acoustic-transducer.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electric-mechanical-acoustic-transducer, comprising:

a diaphragm;

a movable section;

a driving section for generating a driving force for vibrating the diaphragm and the movable section; and a suppression section for suppressing a sharpness (Q factor) of a vibration force obtained by the vibration of the movable section.

2. An electric-mechanical-acoustic-transducer according to claim 1, wherein the movable section includes a magnetic circuit for supplying a magnetic flux to the driving section.

3. An electric-mechanical-acoustic-transducer according to claim 2, wherein the movable section further includes a weight integrated with the magnetic circuit.

4. An electric-mechanical-acoustic-transducer according to claim 1, wherein:

the movable section is provided so as to face the diaphragm, and the suppression section is an elastic member provided oppositely to the diaphragm with respect to the movable section.

5. An electric-mechanical-acoustic-transducer according to claim 4, wherein the elastic member is a sponge.

6. An electric-mechanical-acoustic-transducer according to claim 4, wherein the elastic member is a spring.

7. An electric-mechanical-acoustic-transducer according to claim 1, further comprising a supporting section for supporting the diaphragm, wherein the suppression section includes;

a first magnet provided oppositely to the diaphragm with respect to the movable section which faces the diaphragm, and a second magnet provided in contact with the supporting section so as to face the first magnet and magnetized oppositely to the first magnet.

8. An electric-mechanical-acoustic-transducer according to claim 1, wherein:

the suppression section is a suspension for supporting the movable section, and the suspension is formed of a material having an internal loss coefficient equal to or greater than 0.01.

9. An electric-mechanical-acoustic-transducer according to claim 1, wherein:

the suppression section is a suspension for supporting the movable section, and the suspension is formed of a composite material containing a polymeric material having a high viscosity.

10. An electric-mechanical-acoustic-transducer according to claim 1, wherein:

the suppression section is a suspension for supporting the movable section, and the suspension is formed of a dislocation-type vibration damping alloy.

11. An electric-mechanical-acoustic-transducer according to claim 1, wherein:

the suppression section is a suspension for supporting the movable section, and the suspension is formed of a laminate material containing at least two materials having different internal loss coefficients layered an each other.

12. An electric-mechanical-acoustic-transducer according to claim 11, wherein the suspension is formed of a damping steel plate formed of a laminate material containing a metal and a resin layered on each other.

13. An electric-mechanical-acoustic-transducer according to claim 11, wherein the suspension is formed of a vibration damping alloy which is a laminate material containing at least two metals layered on each other.

14. An electric-mechanical-acoustic-transducer according to claim 1, wherein:

the electric-mechanical-acoustic-transducer further comprises a supporting section for supporting the diaphragm, the supporting section and the diaphragm have a space therebetween, the electric-mechanical-acoustic-transducer further comprises a dividing section, coupled to the movable section and the supporting section, for dividing the space into two, the supporting section has at least one air hole for communicating a space between the dividing section and the supporting section to an outside of the electric-mechanical-acoustic-transducer, and the suppression section includes the dividing section, the supporting section and the at least one air hole.

15. An electric-mechanical-acoustic-transducer according to claim 1, wherein:

the suppression section is provided on the movable section and vibrates together with the movable section.

16. A portable communication device, comprising: a housing; and an electric-mechanical-acoustic-transducer provided in the housing, wherein:

the electric-mechanical-acoustic-transducer includes a diaphragm, a movable section, a driving auction for generating a driving force for vibrating the diaphragm and the movable section, and a suppression section for suppressing a sharpness (Q factor) of a vibration force obtained by the vibration of the movable section, and the housing has a sound hole for releasing a sound generated by the electric-mechanical-acoustic-transducer.

* * * * *

UNITED STATES PATENT AND TRADEMARK OFFICE

CERTIFICATE OF CORRECTION

PATENT NO. : 7,194,287 B2 
APPLICATION NO. : 10/200918
DATED : March 20, 2007
INVENTOR(S) : Sawako Usuki et al.

It is certified that error appears in the above-identified patent and that said Letters Patent is hereby corrected as shown below:

Title Page, Item (56) References Cited, FOREIGN PATENT DOCUMENTS
Change "WO WO 00 32013 6/2000"
to -- WO 00 32013 6/2000 --

Title Page, Item (56) References Cited, FOREIGN PATENT DOCUMENTS
Add --WO 01 41496 6/2001--

Signed and Sealed this

Third Day of July, 2007

JON W. DUDAS
*Director of the United States Patent and Trademark Office*